US009846962B2

(12) United States Patent
Bhiravabhatla et al.

(10) Patent No.: US 9,846,962 B2
(45) Date of Patent: Dec. 19, 2017

(54) OPTIMIZING CLIPPING OPERATIONS IN POSITION ONLY SHADING TILE DEFERRED RENDERERS

(71) Applicant: Intel Corporation, Santa Clara, CA (US)

(72) Inventors: Kalyan K. Bhiravabhatla, Bangalore (IN); Subramaniam M. Maiyuran, Gold River, CA (US); Saurabh Sharma, El Dorado, CA (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 14/865,200

(22) Filed: Sep. 25, 2015

(65) Prior Publication Data

US 2017/0091985 A1 Mar. 30, 2017

(51) Int. Cl.
| | | |
|---|---|---|
| *G06T 15/30* | (2011.01) | |
| *G06T 15/80* | (2011.01) | |
| *G06T 11/40* | (2006.01) | |
| *G06T 15/00* | (2011.01) | |

(52) U.S. Cl.
CPC .............. *G06T 15/30* (2013.01); *G06T 11/40* (2013.01); *G06T 15/005* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 5,767,859 A | 6/1998 | Rossin et al. | |
| 6,525,726 B1 * | 2/2003 | Xie | ........................ G06T 15/40 345/421 |
| 7,292,242 B1 | 11/2007 | Wittenbrink et al. | |
| 2007/0171219 A1 | 7/2007 | Tsao | |
| 2009/0295799 A1 | 12/2009 | Heim | |
| 2011/0242113 A1 * | 10/2011 | Keall | .................... G06F 9/3857 345/505 |

FOREIGN PATENT DOCUMENTS

EP 2879409 A1 7/2016

OTHER PUBLICATIONS

PCT Search Report and Written Opinion dated Nov. 28, 2016 in corresponding PCT/US2016/048514 (8 pages).

* cited by examiner

*Primary Examiner* — Robert Bader
(74) *Attorney, Agent, or Firm* — Trop Pruner & Hu, P.C.

(57) ABSTRACT

Marking "Clipped Triangles" as visible triangles for all tiles may be avoided by instead finding an approximate clipping area and marking the triangles as visible only in those tiles in the Position Only Shading Pipe (POSH) pipe. This avoids rendering the triangle in the replay pipe in those tiles where it may not be visible.

15 Claims, 16 Drawing Sheets

US 9,846,962 B2

OPTIMIZING CLIPPING OPERATIONS IN POSITION ONLY SHADING TILE DEFERRED RENDERERS

BACKGROUND

The contemporary graphics processing architectures follow the virtual pipeline in which the vertices are transformed via vertex shaders, then the pixels are rasterized from triangles, which are then pixel shaded and written to the frame buffer. However not all the triangles produce pixels, because some of them are culled even before the rasterization phase. Unfortunately, the cull runs tend to starve the pixel and compute pipes.

To solve this issue, a hardware mechanism called Position Only Shading pipe (POSH) uses two geometry pipes, a trimmed version called as POSH pipe and a full version called as replay pipe. The POSH pipe runs ahead and records visibility information of the triangles while the replay pipe uses this information to skip the vertices and shade only the passing vertices. Render targets can be subdivided into some number of tiles and then the POSH pipe can be used to do visibility recording per tile and each tile can be processed one after other in the graphics processor.

In the POSH pipe, all the triangles that must go through clipping may be treated as visible. Triangles that lie partially inside the viewport may be treated as visible for all tiles as the POSH pipe itself will not evaluate the entire clipping operation. If the total number of such triangles are fractional percentage of the entire number of triangles that appear at the input of a graphics processor throughout may not be significantly adversely affected.

BRIEF DESCRIPTION OF THE DRAWINGS

Some embodiments are described with respect to the following figures.

DETAILED DESCRIPTION

In some embodiments, marking a "Clipped Triangle" as a visible triangle for all tiles is avoided, while at the same time the entire clipping operation is not redone inside the position only shading pipe.

Marking "Clipped Triangles" as visible triangles for all tiles may be avoided by instead finding an approximate clipping area and marking the triangles as visible only in those tiles in the POSH pipe. This avoids rendering the triangle in the replay pipe in those tiles where it may not be visible.

Figure 1:
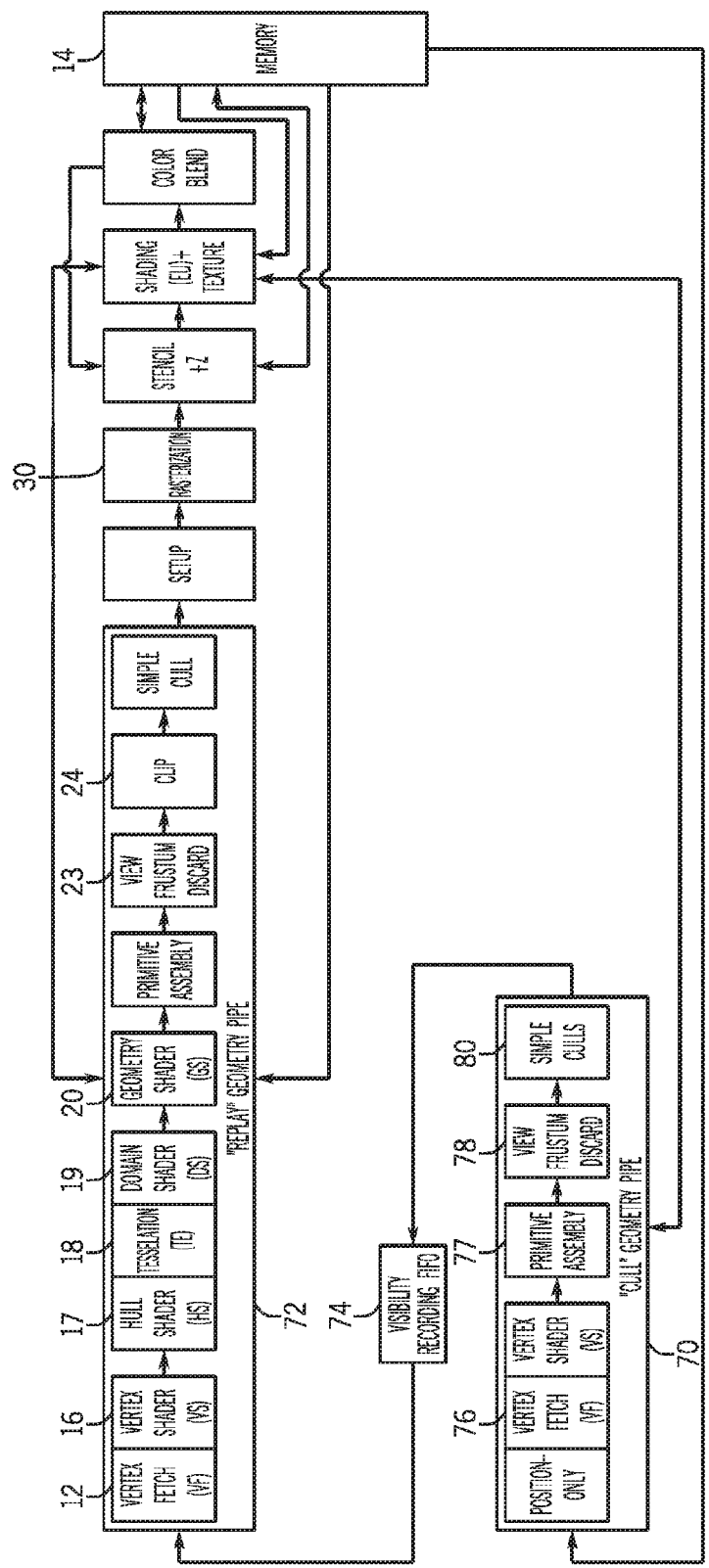
FIG. 1 is a block diagram for one embodiment.

POSH-based tiled deferred rendering refers to using a position only hardware pipe to sort the triangles to different tiles and create visibility information for each tile in the position only shading pipe. After the entire render target worth of visibility information is calculated, the replay pipe uses this visibility information and renders one tile at time. FIG. 1 shows a typical position only shader based graphics processing unit.

Clipping in a three-dimensional (3D) graphics pipeline is generally performed to discard portions of the scene that lie outside of the view frustum. A clip stage 24 examines the positions of the incoming vertices and performs the vertex clip test against the view frustum. The results of clip test of all vertices in an object determines how the object is processed further down the pipeline.

Objects that are completely outside the view volume are discarded or trivially rejected (TR). Objects that are contained completely inside the view volume remain unchanged and are directly sent down the pipeline for further processing or Trivially Accepted (TA). Objects that are intersected by the view volume are sent to the Clip Processing stage so that they can be split into primitives that only lie within the view volume, which operation is called the Must Clip Operation (MC).

As shown in the FIG. 1, a typical POSH implementation takes care of marking triangles that are completely outside view frustum (TR) as not visible. Triangles that are completely inside are further tested with each tile window to find if the particular triangle is visible per tile or not and correspondingly marked as visible or not visible per tile. Triangles that intersect the view frustum are generally treated as visible for all tiles as a final clipping operation has not been performed yet.

FIG. 1 shows a simplified block diagram of an architecture that has two geometry pipes—the Cull Pipe 70 and the Replay Pipe 72. Both the pipes execute different instances of the same application where each instance can be working on a completely different draw call. The responsibility of the Cull Pipe is to compute the visibility information of the triangles whether the triangle is rejected or not. This information is stored in the Visibility Recording First In First Out (FIFO) 74 that in turn is consumed by the Replay Pipe for skipping the discarded triangles. Moreover, the Cull Pipe generates this critical information faster by only fetching and shading the position attributes. In this way, both the pipes work together to reduce the amount of work required for the culled triangle sequences and also to skip them efficiently.

As shown in FIG. 1, the Cull Pipe is shallow as well as leaner when compared to the Replay Pipe. It has a position-only VF-VS stage 76 for shading the position attributes followed by the primitive assembly 77 and viewport frustum discard stage 78 and the simple cull stage 80. In other words, the instruction set in the culling pipe only includes those instructions needed for calculating position attributes and does not have the instruction for calculating other shader attributes. This shallow pipeline computes the visibility information for each triangle of a draw call and records this information in a chronological order inside the visibility recording FIFO. The recorded information is kept as a bitwise sequence, for example using 0 for the failing triangle and 1 for the passing triangle and, thus uses a small amount of storage area in some embodiments. The Cull Pipe may run at least one draw call ahead such that the Replay Pipe is not starved for the visibility information. Usually, a 3D frame is made up of varying numbers of render-passes that work on a given render-target(s). A frame ends in the composition phase where the intermediate information recorded in the render targets is blended together to generate the final frame buffer. Each render pass has an arbitrary number of draw calls that in turn is actually a collection of triangulated surfaces that define the shape of the object. Since the cull pipe avoids the rasterization as well as the rendering of pixels for a draw call, it can run ahead and compute the visibility information in a timely manner. However, if the information for a draw call is not available then the replay pipe may stall. Similarly, if there is no room in the visibility recording FIFO then the cull pipe may stall.

Some of the important pipe stages like tessellation 18 and geometry-shader 20 are missing from the Cull Pipe in some embodiments. It is natural to ask what happens to the draw calls that require tessellation, geometry shader or both. The Cull Pipe skips the draw calls that have these states enabled and in turn the Replay Pipe will handle them in a regular manner—i.e. replay pipe will not be expecting the visibility recording for these draw calls. To accomplish this, a driver sets a bit in the draw call command i.e. whether the command comes into the domain of cull pipe or not. Similarly, there can be conditions when the vertex-only draw calls require information that is computed via the pixel shaders of the previous draw calls. This happens very rarely in applications but the driver still sets the bit indicating that these kinds of draw calls will not be handled via the Cull Pipe. These are few of the reasons why the Replay Pipe still has the discard logic 23 present in its pipeline, because for all the other cases the replay pipe will be working only on the visible triangles and for them the discard logic is not required.

Finally, there is not a regular clipping stage present in the cull pipe in one embodiment, so the triangles that intersect with the view frustum planes will be treated as passed (i.e. they can be marked as visible in the culling pipe), then the replay pipe handles all of the primitive clipping.

As explained earlier, the visibility FIFO may record the information as bitwise sequence for every triangle of a draw call—i.e. 0 for the failing triangle while 1 for a passing triangle. This information present in the FIFO is generated via the cull pipe and is consumed by the replay pipe for skipping the discarded triangles. Thus, the size of the FIFO governs how far the cull pipe can run ahead, and hence, can impact the performance of the architecture.

The visibility FIFO can record 256K bytes worth of vertex information can provide optimal performance in some embodiments. This information may be bounded by two scenarios and are elaborated below:
  Strip Case: Each vertex is a triangle then we need: 256K1(8×1024)=>32 KB
  List Case: When three vertices make a triangle: 256K1 (3×8×1024)=>~11 KB In some instances, a draw call driver can choose to enable or disable visibility recording. For example if there are only a few vertices in the draw call, the overhead associated with visibility recording may not justify the cost of visibility recording in terms of time, memory bandwidth and compute cycles. Other examples where visibility recording may be disabled for a particular draw call include lines and cases where all the vertices in the draw call are known to be visible.

The local memory is used for recording the shaded attributes of the vertices that are referenced both by the discarding logic in the geometry pipe as well as the pixel pipe for rendering pixels. Recall that vertices can have arbitrary number of attributes like position, normal, color, texture-coordinates etc. These attributes are shaded with the help of vertex shaders 16 and the outcomes are recorded in the local memory 14 for future reference. The recorded information is dereferenced whenever it is no longer required—for example, when the triangle is discarded by the culling logic or when all the pixels for a given triangles are rendered. This local memory may be a free-list of registers that are allocated for a vertex and then finally returned to the pool when not required.

In the case of cull pipe, the local memory records attributes that are needed for computing positions of the vertices. Furthermore, the lifetime of these local memory registers is short when compared to the base model because all the triangles are dropped at the end of the cull pipe. However, the capacity of the local memory can still impact the performance of the architecture. The ideal capacity is a function of the execution latency of the position shaders, which not only depends on the number of dynamic instructions present in the position shader but also depends on the demand on the compute clusters by other resources like pixel shaders and shaders emanating from the replay pipe. Thus, if the cull pipe is inappropriately sized, this can thwart the forward progress of cull pipe, and hence, the overall performance.

The Cull Pipe can use 64 KB worth of local memory to stream properly in some embodiments.

This architecture fetches and shades only position attributes for the discarded objects, and secondly, it can tolerate the long running cull sequences by skipping them. The first aspect reduces the amount of work while the second aspect reduces the amount of time to render a frame, and hence, helps in decreasing the energy footprint of the system.

In addition, in some embodiments, the position-only shading may be disabled. For example a draw call may indicate that position-only shading will not be used. This may save memory bandwidth, compute cycles and/or time. Thus the system may selectively disable and then enable position-only shading, for example on a draw call by draw call basis.

When position-only shading is disabled, the replay pipeline does not look for any bitwise information for that draw call and there is no visibility information for the entire draw call.

Culling techniques can improve performance in a graphics processor. Standard techniques include backface culling, view frustum culling, Z-max occlusion culling, and occlusion queries. In general, a culling technique reduces the amount of unnecessary work done to render an image, e.g., by discarding triangles that are fully outside the field of view (also called the view frustum in graphics). The earlier a culling test can be performed in a graphics pipeline, the better, because then the data can be discarded in the pipeline earlier, and the costs can be reduced. Zmax-occlusion culling may be performed earlier using a position-only shading (POS) pipeline.

A conservative depth representation is recorded per tile (which may represent a rectangular region of pixels in one embodiment) in the Cull Pipe. Then, for all triangles going through the cull pipe, one can test if a triangle is fully occluded with respect to the conservative depth representation. If the triangle is occluded, then it will be culled, and it will not survive until the replay pipe. This provides for power savings and/or a performance increase in some workloads.

In order to be able to do occlusion culling, the graphics processor needs to have some kind of occlusion representation. This information could be a depth per pixel, but to reduce storage costs, it can make more sense to have a coarser and conservative representation. One type of representation is to store a maximum depth (Zmax) and a minimum depth (Zmin) scalar value per tile. The Zmax is greater or equal to the largest depth in the tile, and Zmin is less than or equal to the smallest depth in the tile. Hence, if a triangle resides completely inside a single tile, for example, and if the triangle's depths are larger than the tile's Zmax, then that triangle is occluded by already rendered geometry, and therefore, the triangle can safely be culled. The Zmin is useful when the depth test is reversed (e.g., OpenGL depth functions: GREATER or GEQUAL). Each tile may have a depth representation, and one way to implement this depth representation is to use Zmin and Zmax as described above.

Figure 2:
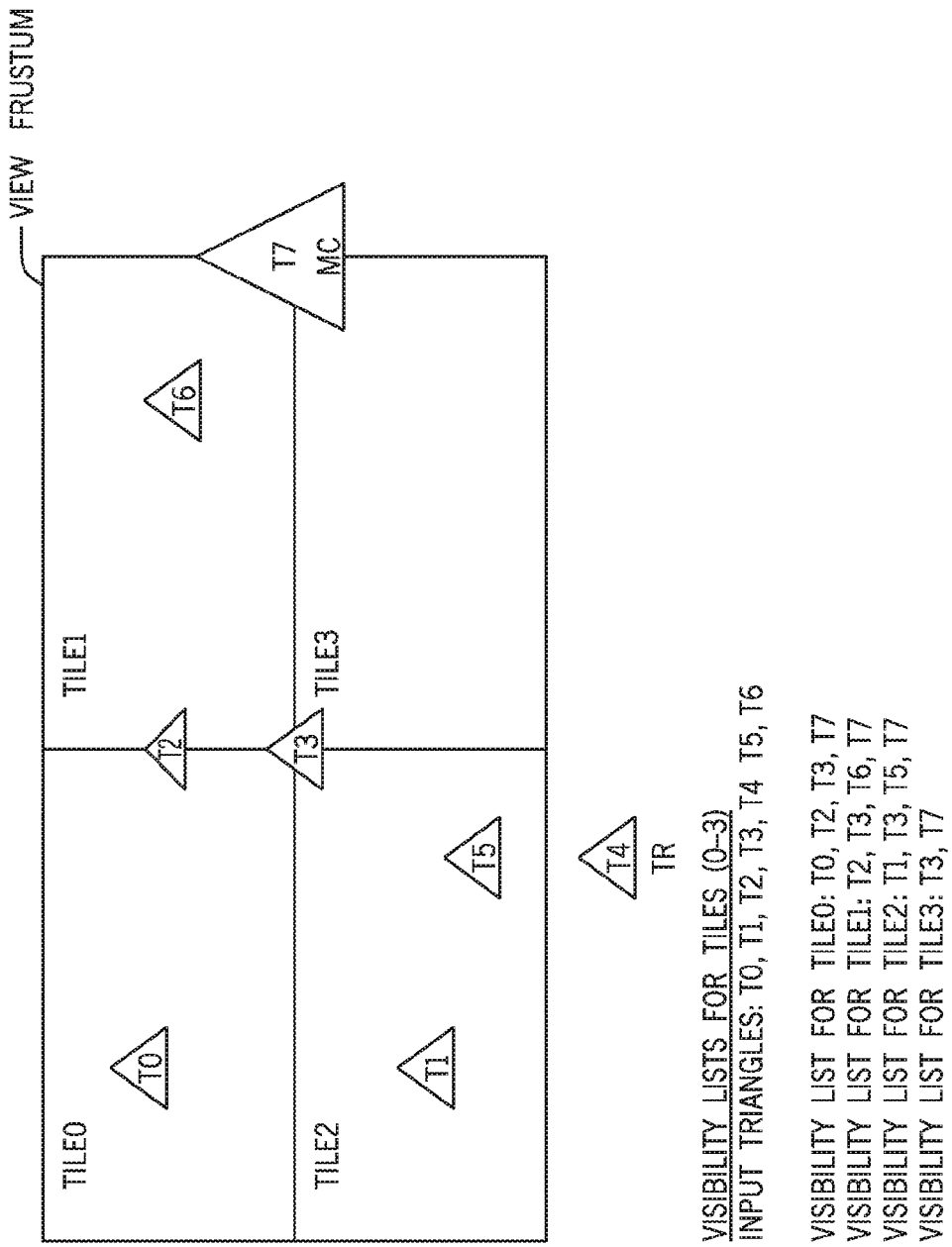
FIG. 2 is a depiction of sorting triangles to a tile visibility list according to one embodiment.

FIG. 2 shows a simple example of how a triangles (T0-T7) get sorted into visibility lists per tiles (0-3) depending on where the triangle falls in the view frustum. The triangle T7 that is marked as "must clip" (MC) appears in the visibility list of all tiles. T4 is marked trivially rejected since it is entirely outside the view frustum.

The total number of must clip triangles in graphics workloads tends to be a small fraction of total number of primitives. Therefore, it may be acceptable to repeat them across all the tiles instead of evaluating the exact extents to which they fall to find the visibility status of such triangle. This argument holds if the number of tiles that the total render target divided into is small. As the number of tiles increases, must clip triangles that must be repeated in all tiles becomes so significant that they impact the overall performance.

Repeating these must clip triangles across all the tiles may be avoided by finding an approximate bounding box they may fall into post clipping operation. These calculations may be implemented at a small computational cost and one need not implement the entire clipping algorithm.

Figure 3A:
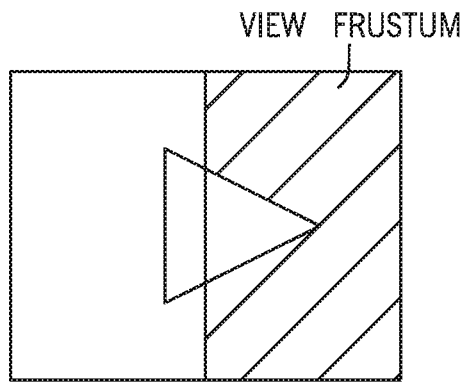
FIG. 3A shows a triangle before far plane clipping.
Figure 3B:
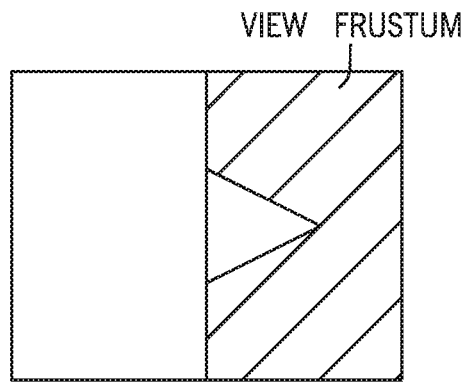
FIG. 3B shows far plane clipping according to one embodiment.

A must clip operation usually involves clipping the triangle's edges to either one or all of the viewport frustum edges, namely near, far, left, right, top, bottom edges. FIG. 3B shows how the triangle's output changes post clipping if the unclipped triangle (FIG. 3A) were to be clipped with a far plane.

Now the clipping operations are divided depending on which plane is being clipped. A triangle clipped with either near or far planes, means that the triangle is within the view frustum left, right, top and bottom edges but only crosses the near and/or far edges. The output triangle bounding box is still within the original triangle bounding box in this case. Thus if the triangle is getting clipped with near and/or far edges only then it can be treated just like a TA triangle. The rest of visibility tests can be performed as it is and the triangle is repeated in only required tiles.

Figure 4A:
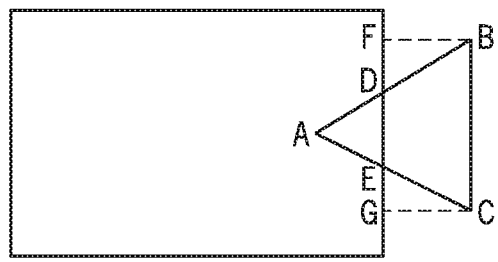
FIG. 4A shows a triangle before right plane clipping.
Figure 4B:
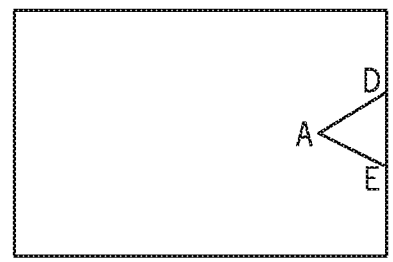
FIG. 4B shows right plane clipping according to one embodiment.

If the triangle (FIG. 4A) were to be clipped with Right/Left/Top/Bottom planes of the view frustum only a partial portion of the triangle will be visible as indicated in FIG. 4B for right plane clipping. The exact point where an edge cuts the plane needs to be found iteratively for all the edges and for all the planes that are intersecting the triangles. These costly clipping operations involve floating point arithmetic operations.

Figure 4C:
FIG. 4C shows the result of approximate right plane clipping according to one embodiment.

Instead of finding the exact intersection of edge and plane, the intersection can be easily approximated to an area where the edges that are crossing the boundary can be clamped to the boundary as shown in FIG. 4C. This new triangle can be used to test against the tile extents, instead of repeating the triangle in all the tiles.

Rather than doing post right plane clipping as an example, such that a triangle with vertices A, B, and C is reduced to a triangle having vertices A, D and E as shown in FIG. 4B, approximate right plane clipping can be used instead. Then the triangle is clipped to approximate area determined by clamping the edges B and C to the points F and G of the right plane. The resulting triangle has vertices A, F and G as shown in FIG. 4C.

Figure 5:
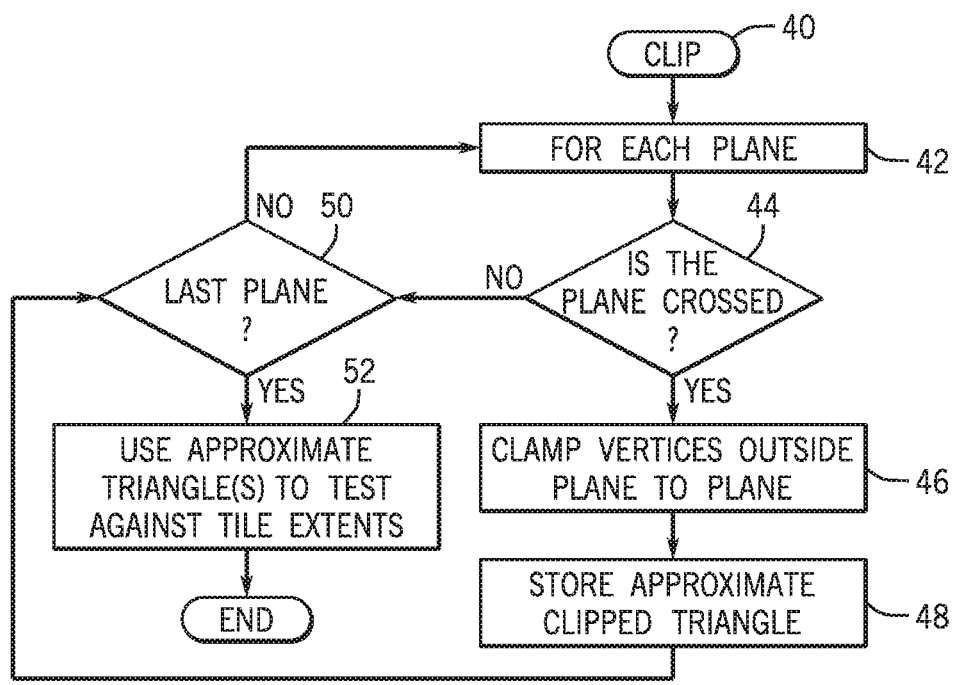
FIG. 5 is a flow chart for one embodiment.

Referring to FIG. 5, the sequence according to one embodiment to the present invention may be implemented in software, firmware and/or hardware. In software and firmware embodiments it may be implemented by computer executed instructions stored in one or more non-transitory computer readable media such as magnetic, optical or semiconductor storage. For example, the instructions may be part of a graphics processing unit or a storage associated with a graphics processing unit.

Thus referring to FIG. 5, a clip sequence 40 begins by performing a sequence for each potential clipping plane as indicated in block 42. The potential clipping frames may include top, bottom, near, far, right and left.

Then for each plane, it is determined in diamond 44 whether the plane is crossed. If so, the vertices outside the plane are clamped to the plane as indicated in block 46. Then the approximate clipped triangle is stored as indicated in block 48. Then the flow iterates back to diamond 50. In block 52, the approximate triangle(s) are used to test against tile extents.

At diamond 50, a check determines whether the last plane has already been processed. If so, the flow ends. Otherwise the flow iterates back to block 42 for the next plane.

A simple mechanism can deal with near/far triangle clipping and other plane clipping cases that enables POSH pipe to visibility tests on these cases also and repeat the triangles only in the requires tiles instead of repeating them for all the tiles.

This mechanism is different from clipping the bounding box of the triangle to the view frustum and then comparing the resulting bounding box to the tiles. Here the output from clipper is still a triangle or trifan. This enables the tile comparison logic to use either the bounding box of the triangle to compare the tile extents or use the pixel level test to see if the triangle is inside the tile or not.

Figure 6:
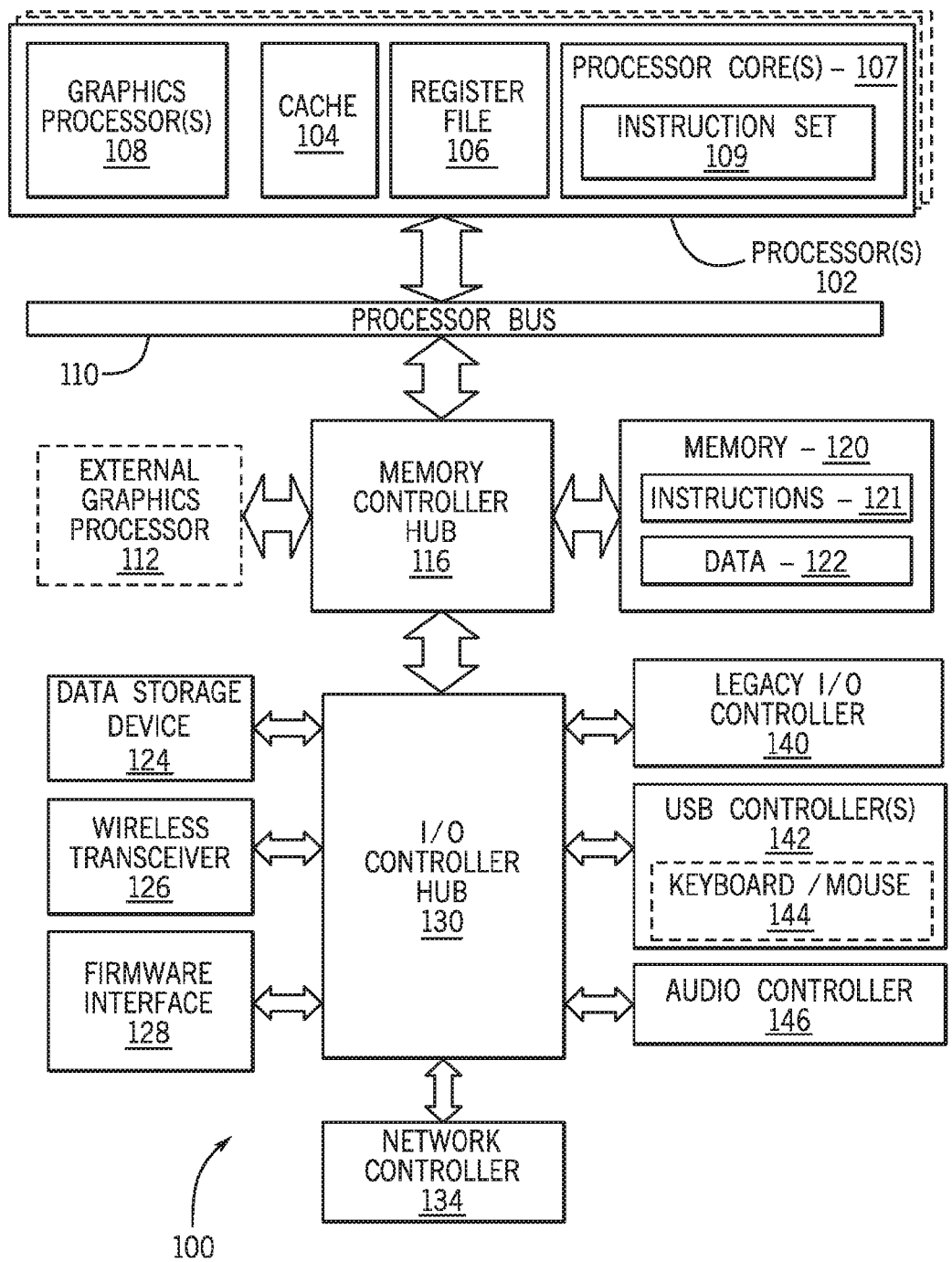
FIG. 6 is a block diagram of a processing system according to one embodiment.

FIG. 6 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 7:
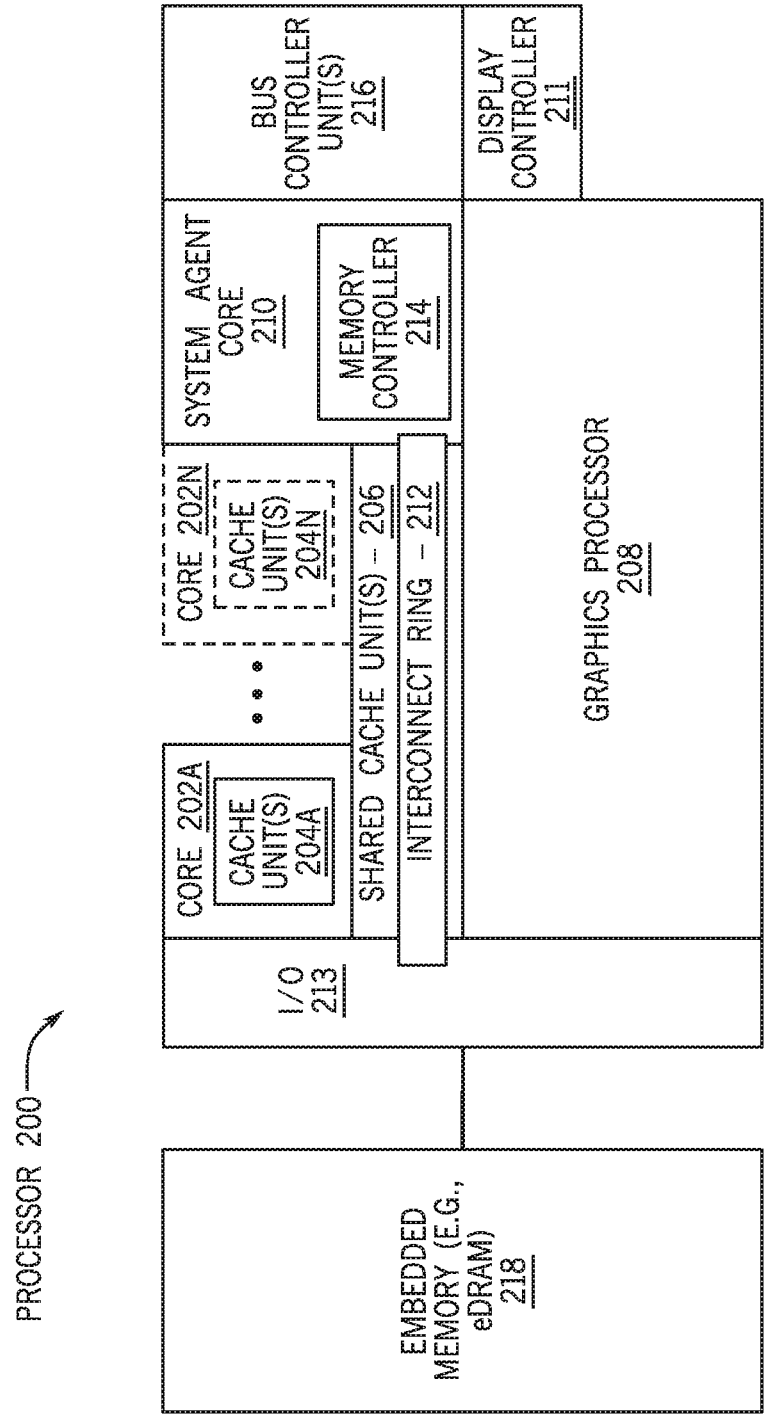
FIG. 7 is a block diagram of a processor according to one embodiment.

FIG. 7 is a block diagram of an embodiment of a processor 200 having one or more processor cores 202A-202N, an integrated memory controller 214, and an integrated graphics processor 208. Those elements of FIG. 7 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 8:
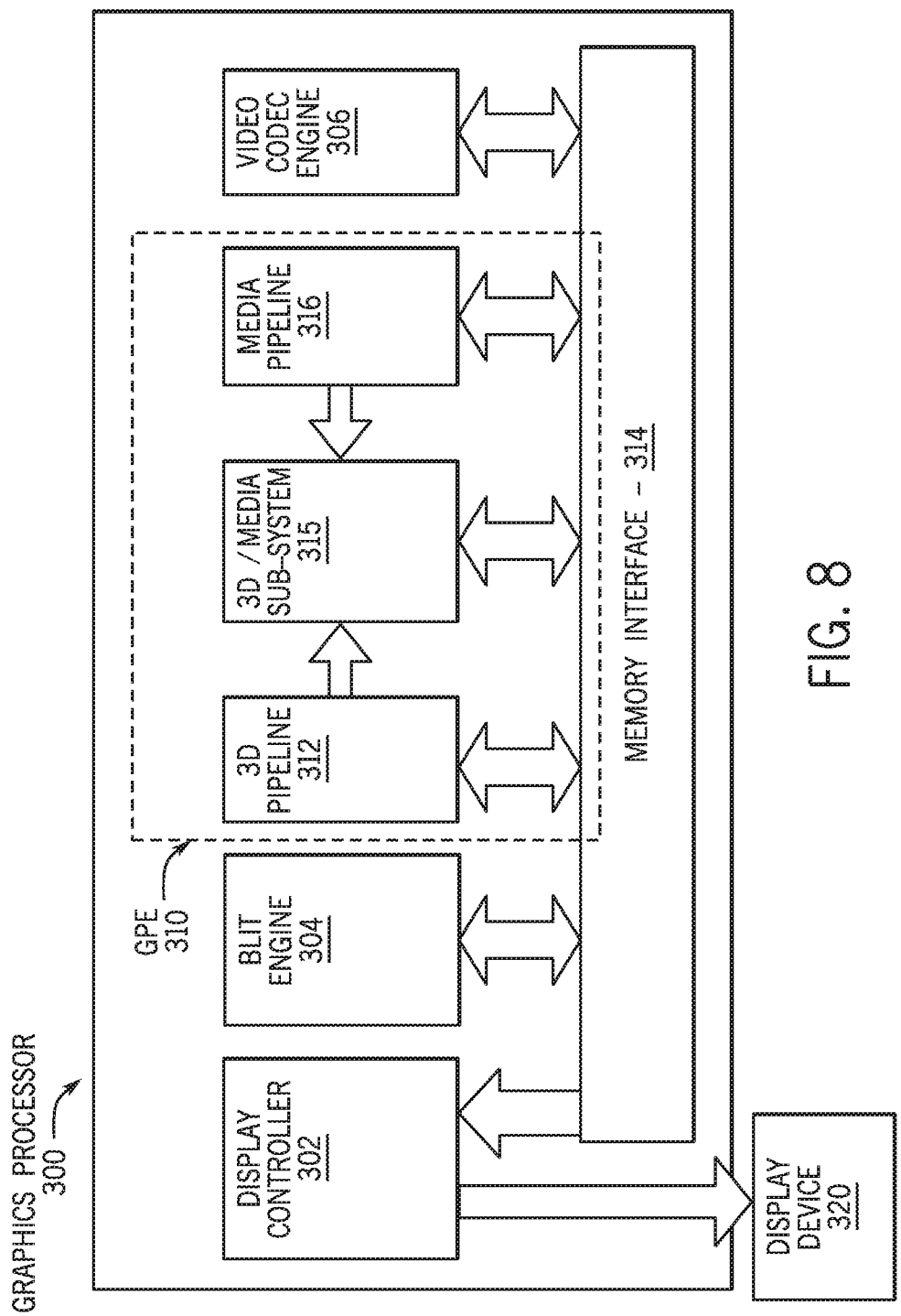
FIG. 8 is a block diagram of a graphics processor according to one embodiment.

FIG. 8 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Figure 9:
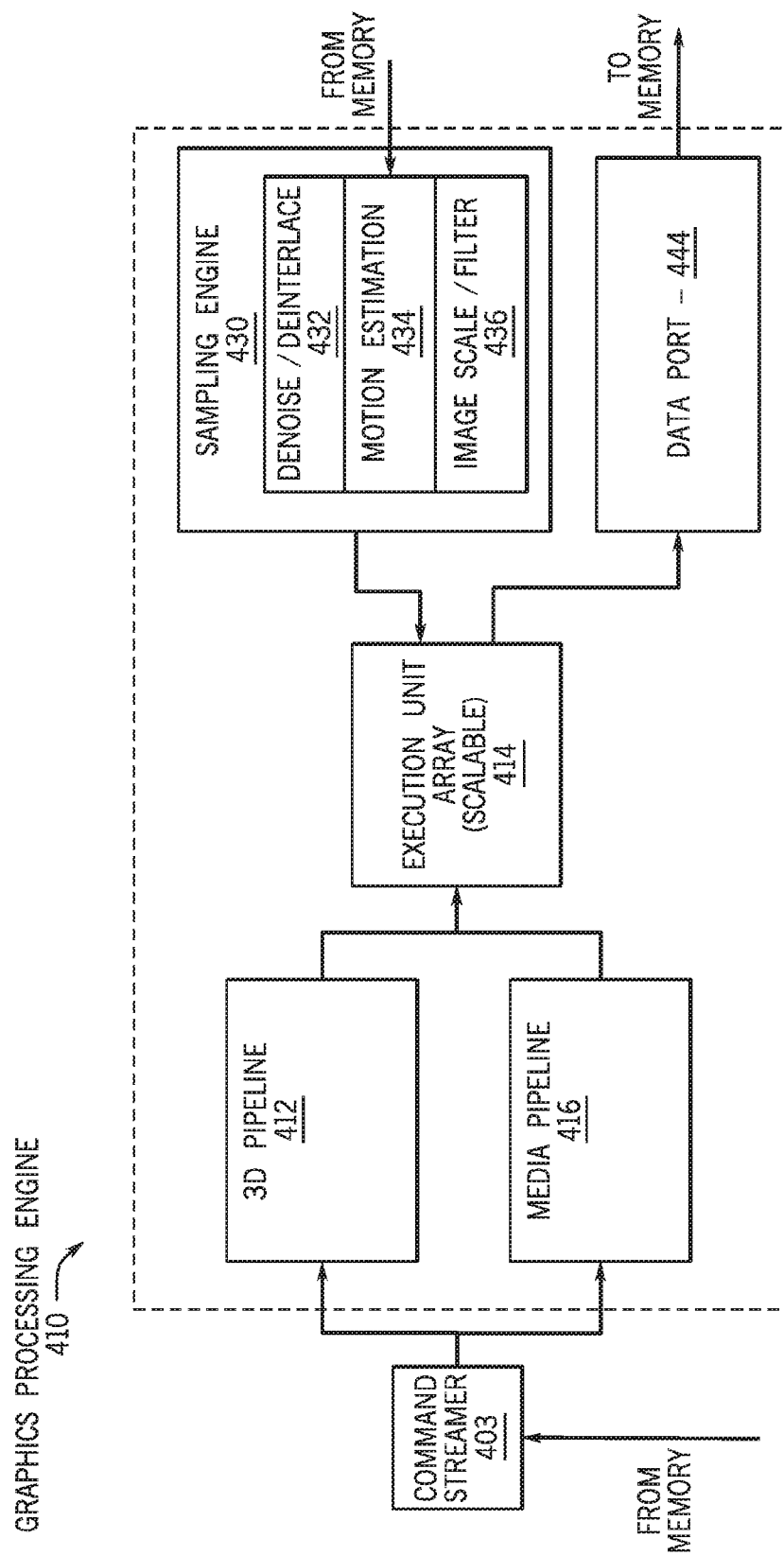
FIG. 9 is a block diagram of a graphics processing engine according to one embodiment.

FIG. 9 is a block diagram of a graphics processing engine 410 of a graphics processor in accordance with some embodiments. In one embodiment, the GPE 410 is a version of the GPE 310 shown in FIG. 8. Elements of FIG. 9 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Figure 10:
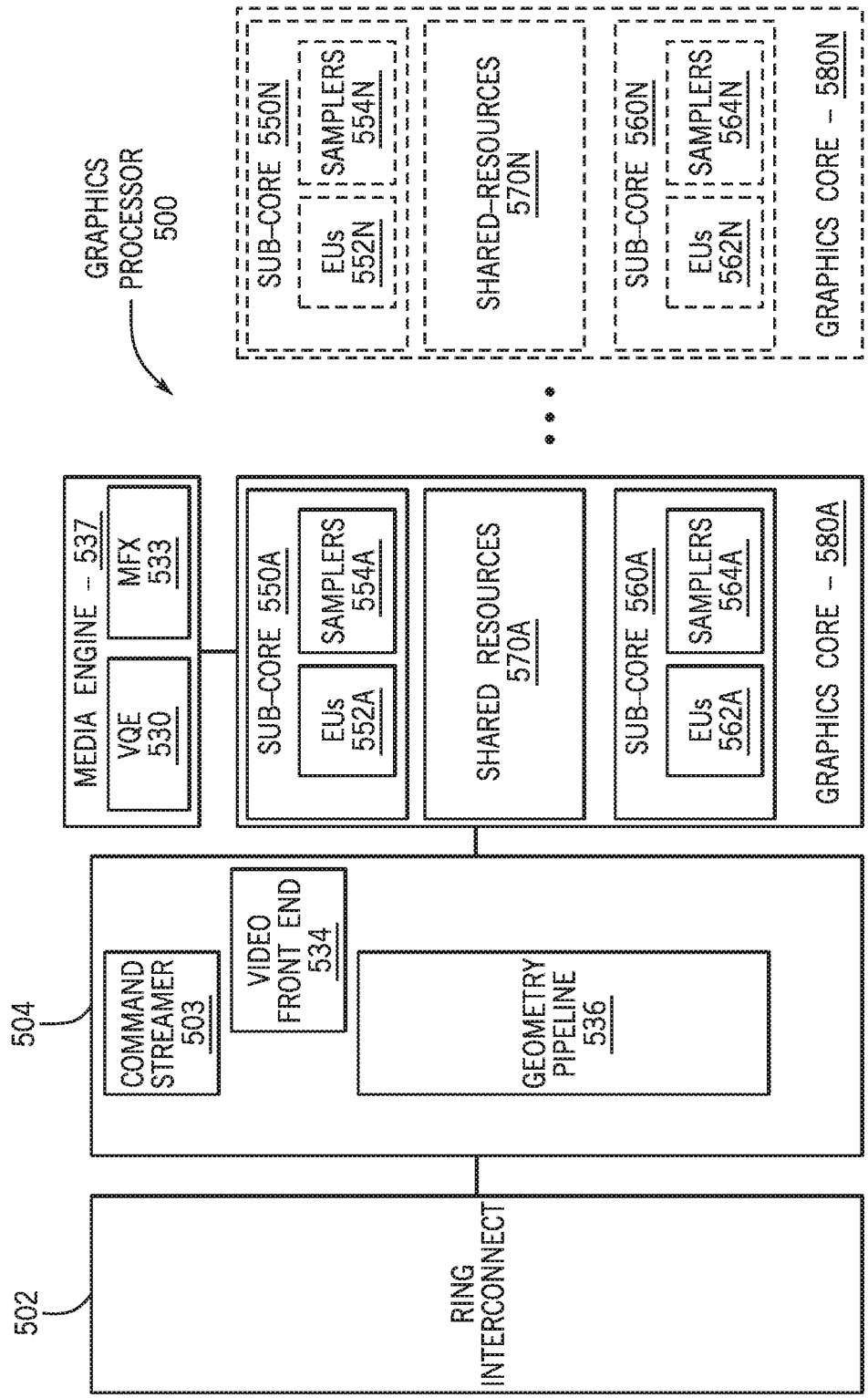
FIG. 10 is a block diagram of another embodiment of a graphics processor.

FIG. 10 is a block diagram of another embodiment of a graphics processor 500. Elements of FIG. 10 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 11:
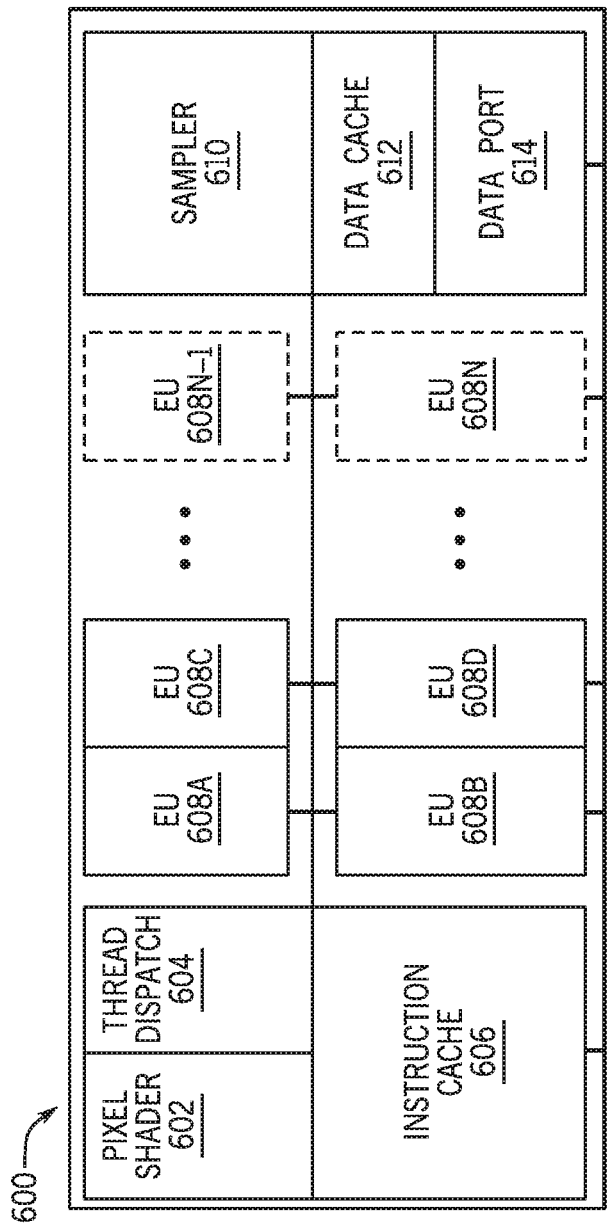
FIG. 11 is a depiction thread execution logic according to one embodiment.

FIG. 11 illustrates thread execution logic 600 including an array of processing elements employed in some embodiments of a GPE. Elements of FIG. 11 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 10) dispatches vertex processing, tessellation, or geometry processing threads to thread execution logic 600 (FIG. 11). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 12:
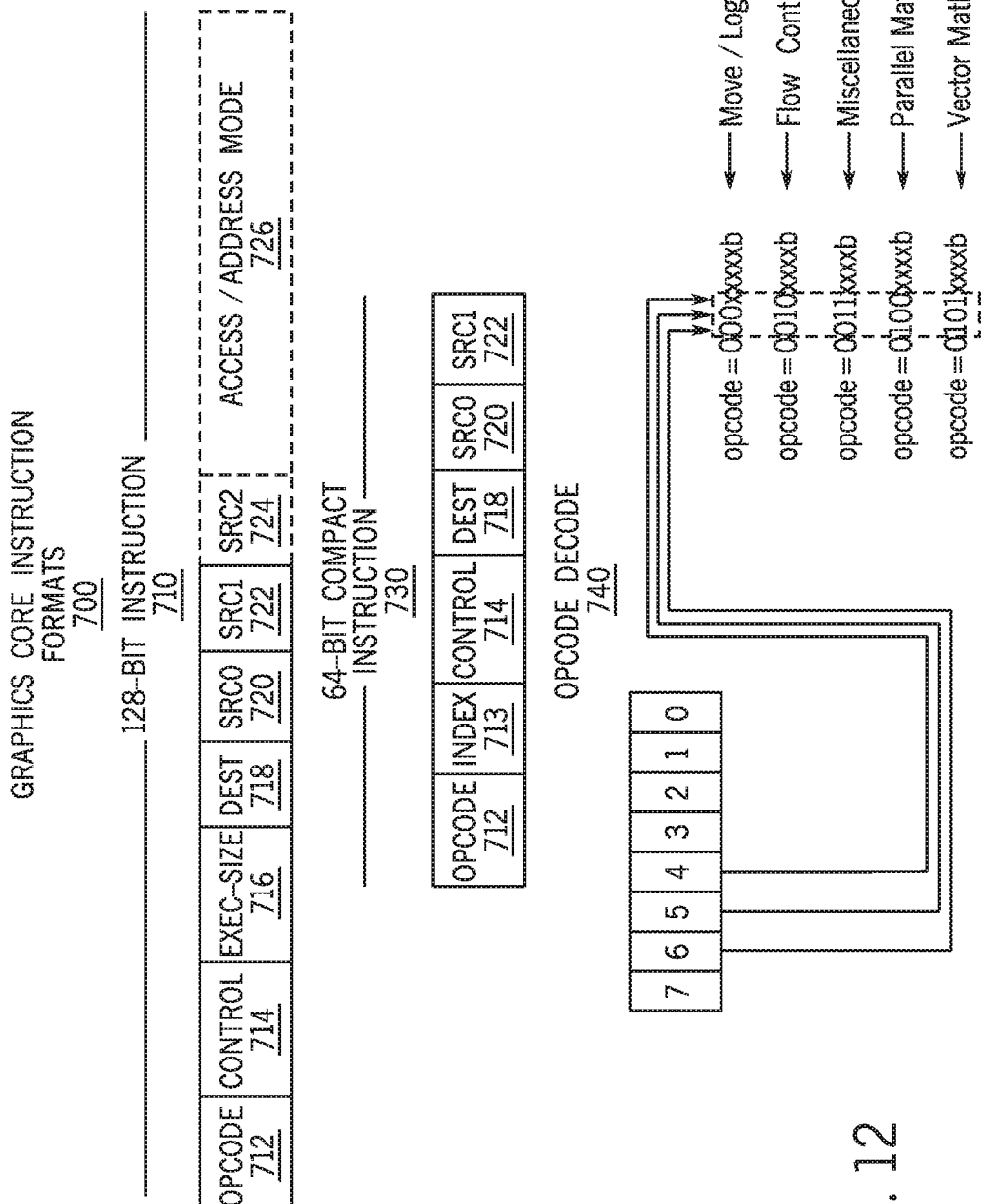
FIG. 12 is a block diagram of a graphics processor instruction format according to some embodiments.

FIG. 12 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 13:
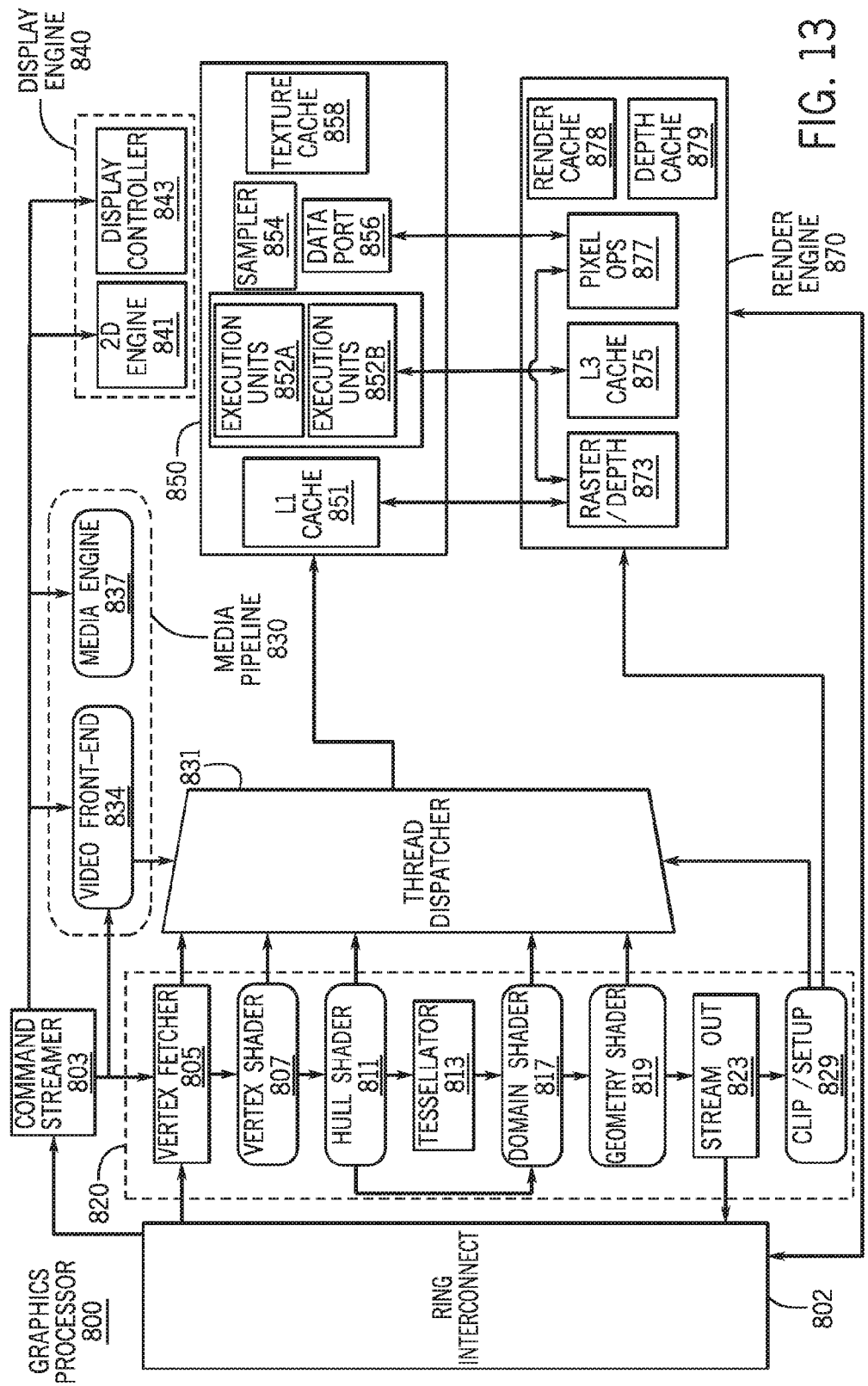
FIG. 13 is a block diagram of another embodiment of a graphics processor.

FIG. 13 is a block diagram of another embodiment of a graphics processor 800. Elements of FIG. 13 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 (see also vertex fetcher 12) and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 (See also hull shader 17 in FIG. 1) configures the tessellation operations. A programmable domain shader 817 (See also domain shader 19 in FIG. 1) provides back-end evaluation of tessellation output. A tessellator 813 (See also tessellator 18 in FIG. 1) operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 (See also geometry shader 20 in FIG. 1) via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807 (See also vertex shader 16 in FIG. 1). In some embodiments, geometry shader 819 is programmable by a geometry shader program to perform geometry tessellation if the tessellation units are disabled.

Before rasterization, a clipper 829 processes vertex data. The clipper 829 (See also clip 20 in FIG. 1) may be a fixed function clipper or a programmable clipper having clipping and geometry shader functions. In some embodiments, a rasterizer/depth 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 (See also rasterization 50 in FIG. 1) and access unrasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 14A:
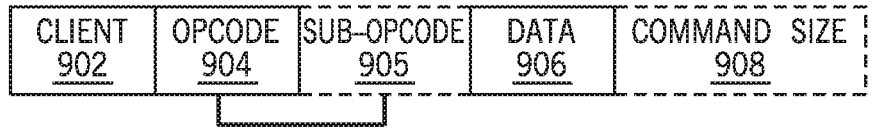
FIG. 14A is a block diagram of a graphics processor command format according to some embodiments.
Figure 14B:
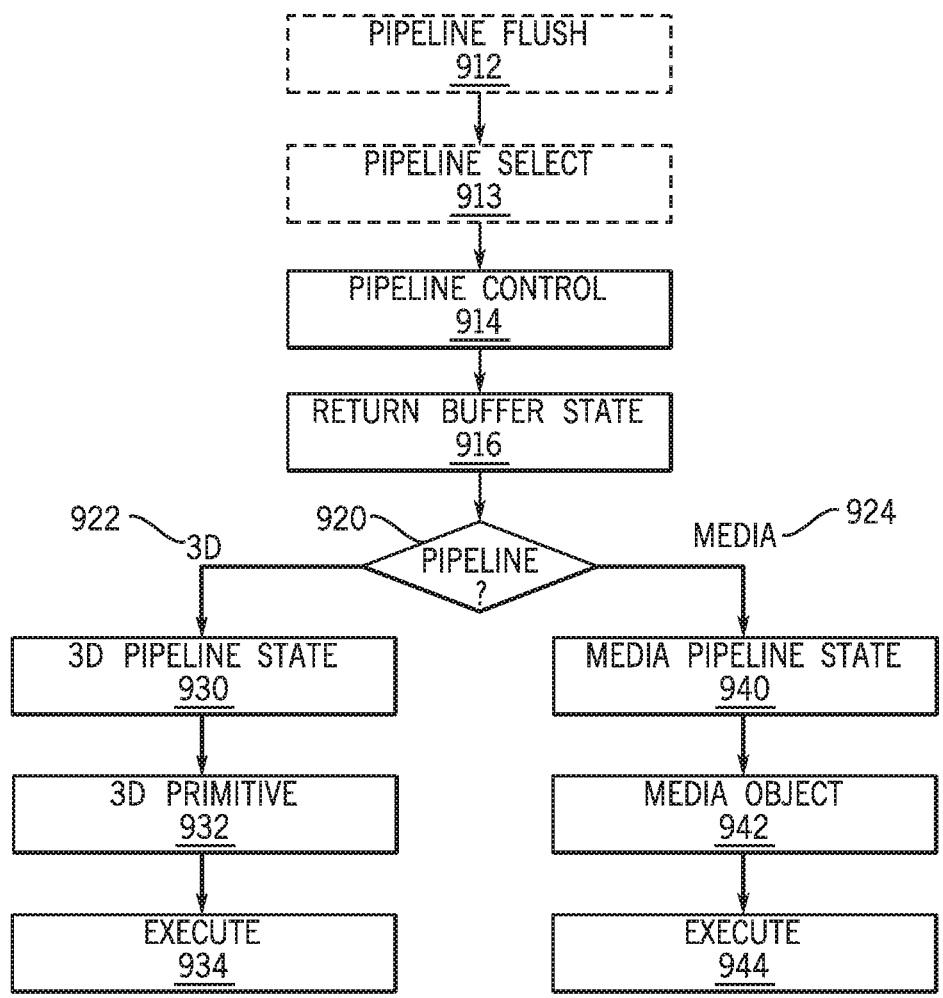
FIG. 14B is a block diagram illustrating a graphics processor command sequence according to some embodiments.

FIG. 14A is a block diagram illustrating a graphics processor command format 900 according to some embodiments. FIG. 14B is a block diagram illustrating a graphics processor command sequence 910 according to an embodiment. The solid lined boxes in FIG. 14A illustrate the components that are generally included in a graphics command while the dashed lines include components that are optional or that are only included in a sub-set of the graphics commands. The exemplary graphics processor command format 900 of FIG. 14A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 14B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Figure 15:
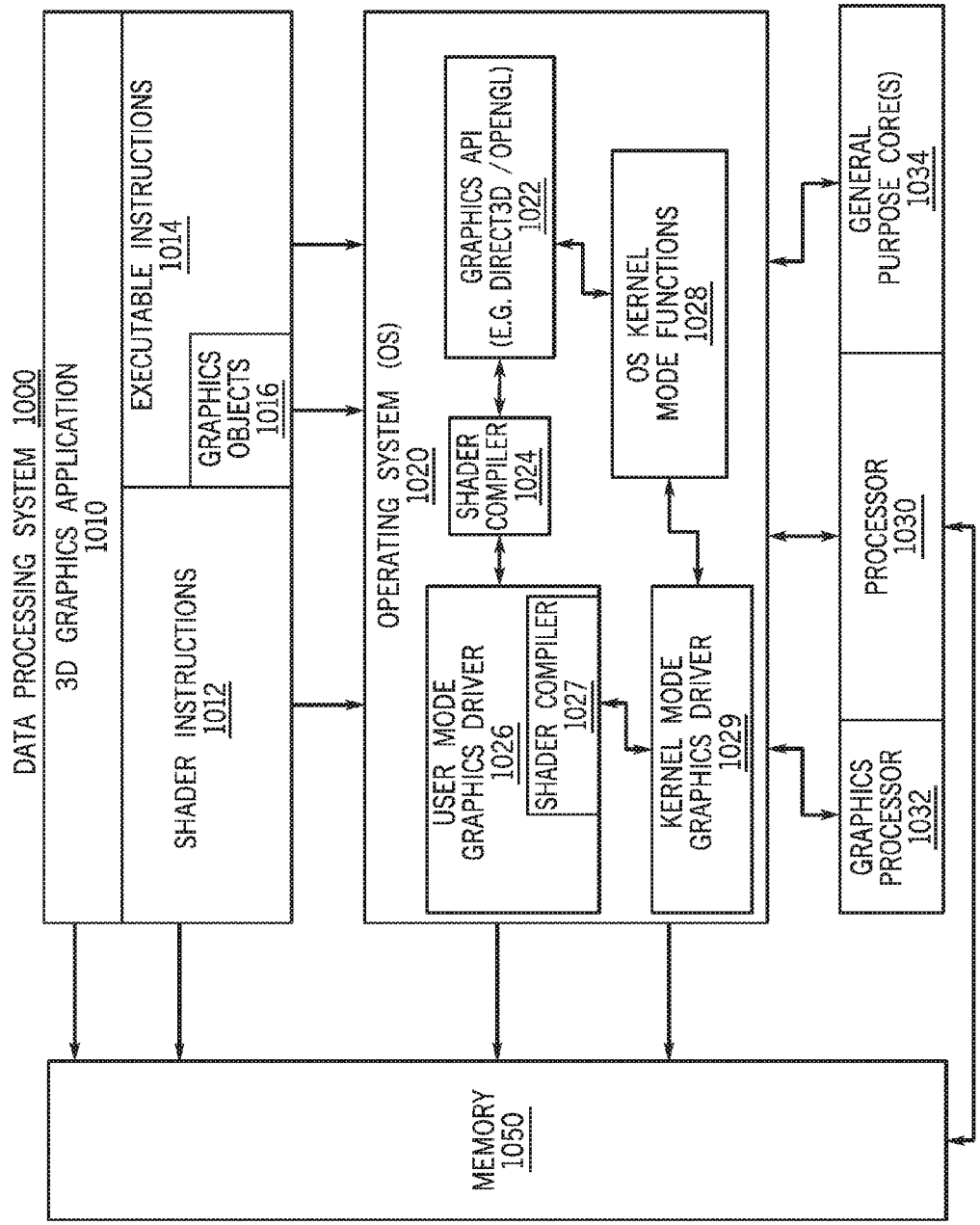
FIG. 15 is a depiction of an exemplary graphics software architecture according to some embodiments.

FIG. 15 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API 1022 is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
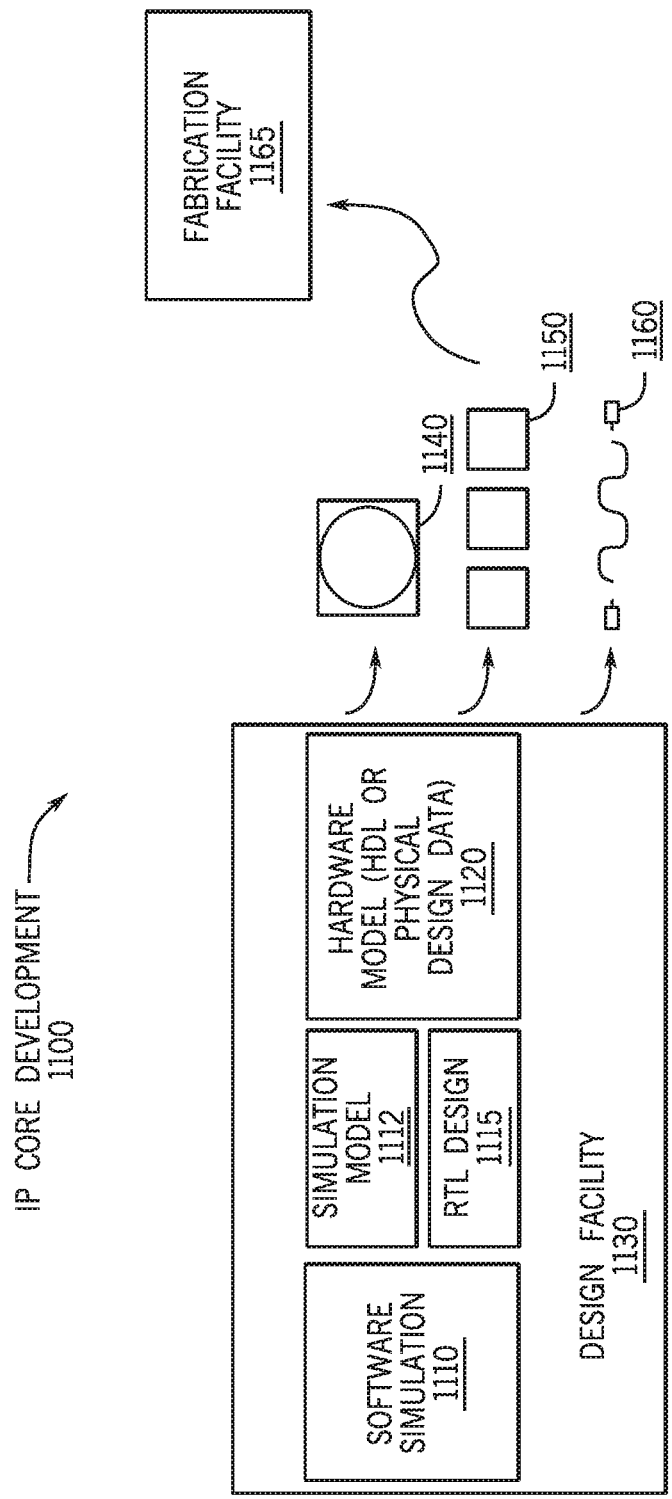
FIG. 16 is a block diagram illustrating an IP core development system according to some embodiments.

FIG. 16 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 17:
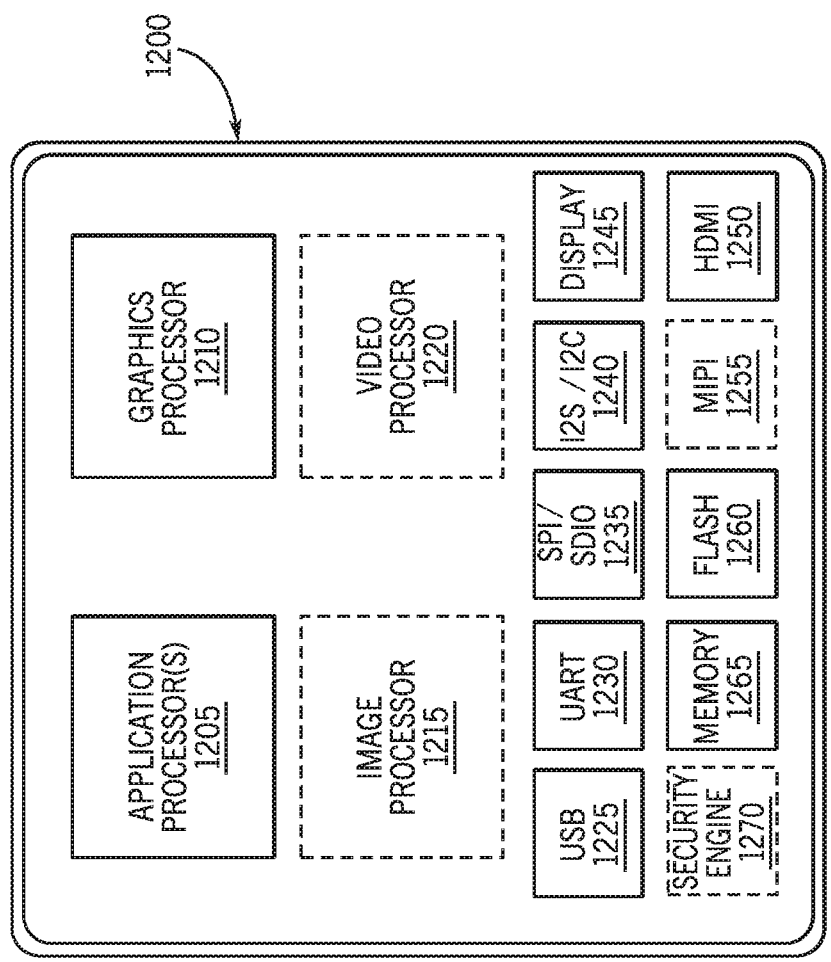
FIG. 17 is a block diagram showing an exemplary system on chip integrated circuit according to some embodiments.

FIG. 17 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

The following clauses and/or examples pertain to further embodiments:

One example embodiment may be a method comprising finding an approximate clipping area, and marking triangles as visible only in those tiles in the approximate clipping area in a position only shading pipe. The method may also include avoiding calculating the intersection of a triangle with a clipping edge. The method may also include finding the approximate clipping area by clamping a vertex outside a view volume to a view volume clipping edge. The method may also include clamping by extending the vertex to the clipping edge along a chord transverse to the clipping edge.

The method may also include clamping two vertices to a clipping edge. The method may also include discarding objects completely outside a view volume. The method may also include directly shading objects contained completely inside a view volume down the pipe. The method may also include sending objects intersected by a view volume to a clip processing stage. The method may also include splitting out primitives that lie only within the view volume.

Another example embodiment may be one or more non-transitory computer readable media storing instructions executed by a processor to perform a sequence comprising finding an approximate clipping area, and marking triangles as visible only in those tiles in the approximate clipping area in a position only shading pipe. The media may include said sequence including avoiding calculating the intersection of a triangle with a clipping edge. The media may include said sequence including finding the approximate clipping area by clamping a vertex outside a view volume to a view volume clipping edge. The media may include said sequence including clamping by extending the vertex to the clipping edge along a chord transverse to the clipping edge. The media may include said sequence including clamping two vertices to a clipping edge. The media may include said sequence including discarding objects completely outside a view volume. The media may include said sequence including directly shading objects contained completely inside a view volume down the pipe. The media may include said sequence including sending objects intersected by a view volume to a clip processing stage. The media may include said sequence including splitting out primitives that lie only within the view volume.

In another example embodiment may be an apparatus comprising a hardware processor to find an approximate clipping area, and mark triangles as visible only in those tiles in the approximate clipping area in a position only shading pipe, and a storage coupled to said processor. The apparatus may include said processor to avoid calculating the intersection of a triangle with a clipping edge. The apparatus may include said processor to find the approximate clipping area by clamping a vertex outside a view volume to a view volume clipping edge. The apparatus may include said processor to clamp by extending the vertex to the clipping edge along a chord transverse to the clipping edge. The apparatus may include said processor to clamp two vertices to a clipping edge. The apparatus may include said processor to discard objects completely outside a view volume. The apparatus may include said processor to directly shade objects contained completely inside a view volume down the pipe. The apparatus may include said processor to send objects intersected by a view volume to a clip processing stage. The apparatus may include said processor to split out primitives that lie only within the view volume.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
    finding, using a hardware processor, an approximate clipping area for an input triangle having one vertex inside a view volume and two vertices outside said view volume, wherein two edges of the input triangle intersect the same clipping edge of said view volume, by clamping the input triangle vertices which are outside said view volume to said same clipping edge by extending the outside vertices to said clipping edge along lines perpendicular to said clipping edge, thereby forming a new triangle having a larger area inside the view volume than the input triangle using the inside vertex of the input triangle and the clamped outside vertices; and
    marking triangles as visible only in those tiles in the approximate clipping area defined by said new triangle in a position only shading pipe of a hardware processor performing deferred rendering.

2. The method of claim 1 including discarding objects completely outside a view volume.

3. The method of claim 1 including sending shading objects contained completely inside a view volume down the pipe.

4. The method of claim 1 including sending objects intersected by a view volume to a clip processing stage.

5. The method of claim 4 including splitting out a portion of a primitive that lies entirely within the view volume.

6. One or more non-transitory computer readable media storing instructions executed by a processor to perform a sequence comprising:
    finding, using the processor, an approximate clipping area for an input triangle having one vertex inside a view volume and two vertices outside said view volume, wherein two edges of the input triangle intersect the same clipping edge of said view volume, by clamping the input triangle vertices which are outside said view volume to said same clipping edge by extending the outside vertices to said clipping edge along lines perpendicular to said clipping edge, thereby forming a new triangle having a larger area inside the view volume than the input triangle using the inside vertex of the input triangle and the clamped outside vertices; and
    marking triangles as visible only in those tiles in the approximate clipping area defined by said new triangle in a position only shading pipe implemented by the processor performing deferred rendering.

7. The media of claim 6, said sequence including discarding objects completely outside a view volume.

8. The media of claim 6, said sequence including sending shading objects contained completely inside a view volume down the pipe.

9. The media of claim 6, said sequence including sending objects intersected by a view volume to a clip processing stage.

10. The media of claim 9, said sequence including splitting out a portion of a primitive that lies entirely within the view volume.

11. An apparatus comprising:
a hardware processor to find an approximate clipping area for an input triangle having one vertex inside a view volume and two vertices outside said view volume, wherein two edges of the input triangle intersect the same clipping edge of said view volume, by clamping the input triangle vertices which are outside said view volume to said same clipping edge by extending the outside vertices to said clipping edge along lines perpendicular to said clipping edge, thereby forming a new triangle having a larger area inside the view volume than the input triangle using the inside vertex of the input triangle and the clamped outside vertices; and mark triangles as visible only in those tiles in the approximate clipping area defined by said new triangle in a position only shading pipe of the hardware processor performing deferred rendering; and
a storage coupled to said processor.

12. The apparatus of claim 11, said processor to discard objects completely outside a view volume.

13. The apparatus of claim 11, said processor to send shade objects contained completely inside a view volume down the pipe.

14. The apparatus of claim 11, said processor to send objects intersected by a view volume to a clip processing stage.

15. The apparatus of claim 14, said processor to split out a portion of a primitive that lies entirely within the view volume.

* * * * *